Dec. 12, 1967   J. R. BUCK   3,357,709
EXPANDABLE MANDREL FOR GRIPPING A WORKPIECE
Filed Oct. 30, 1964
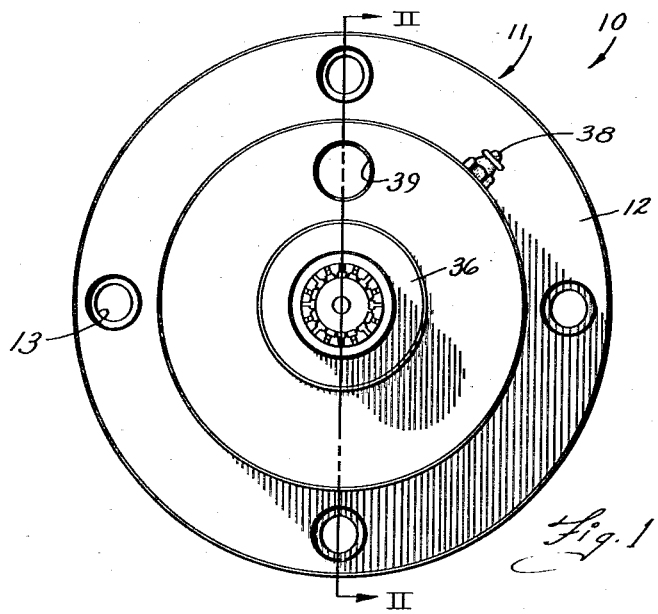
Fig. 1
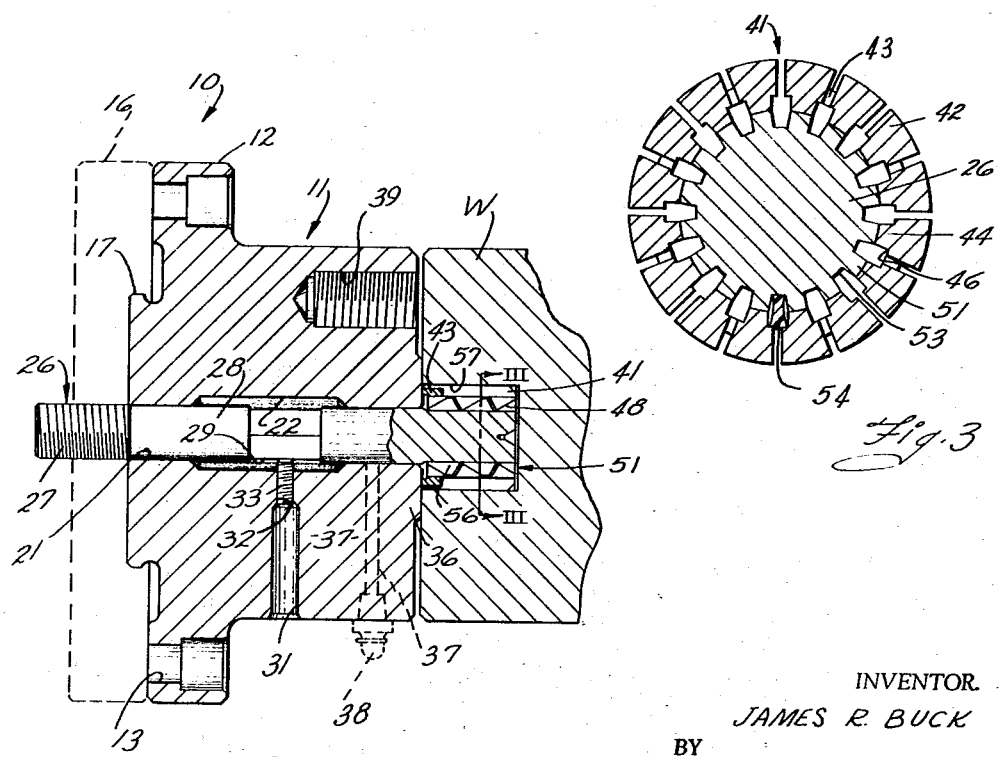
Fig. 2
Fig. 3
INVENTOR.
JAMES R. BUCK
BY
Woodhams, Blanchard and Flynn
ATTORNEYS United States Patent Office 3,357,709
Patented Dec. 12, 1967

3,357,709
EXPANDABLE MANDREL FOR GRIPPING
A WORKPIECE
James R. Buck, Ross Township, Kalamazoo County,
Mich., assignor to Buck Tool Company, Kalamazoo, Mich., a corporation of Michigan
Filed Oct. 30, 1964, Ser. No. 407,750
7 Claims. (Cl. 279—2)

This invention relates to an expandable mandrel construction and more particularly relates to an expanding mandrel adapted for gripping the peripheral wall of a blind hole in a workpiece for supporting said workpiece.

There has long been a need for a mandrel capable of insertion into and expansion within an opening in a workpiece for firmly gripping and supporting the workpiece. Prior art constructions for this purpose of which I am aware have not generally been successful particularly when the opening for receiving the gripping member is relatively small axially and/or radially as compared to the axial and radial extent of the workpiece. The problem is further compounded when the opening in the workpiece is blind. Such previous constructions have been undesirable for holding such workpieces since they generally fail to contact the opening throughout the full length thereof as a result, for example, of actuating mechanisms which extend into the opening initially or during gripping axially beyond the gripping surface of the construction.

Furthermore, such previous constructions have generally depended solely upon the radially expanded mandrel sleeve for preventing wobbling or eccentricity of the workpiece during rotation thereof. Still further, previous constructions have often lacked means for positively axially locating a workpiece thereon in a precisely defined position.

Accordingly, the objects of this invention include:

(1) To provide an expandable mandrel capable of firmly mounting a workpiece thereon by insertion of said mandrel into an opening in the workpiece.

(2) To provide an expandable mandrel, as aforesaid, comprising a rotatably mountable and radially expandable cylindrical member which may rotatably support a workpiece by telescoped entrance into a cylindrical opening in the workpiece and by radial expansion of the periphery of said member into firm contact with the peripheral wall of said opening.

(3) To provide an expandable mandrel, as aforesaid, which is capable of holding a workpiece having either a blind or through opening therein.

(4) To provide an expandable mandrel, as aforesaid, in which the expandable member is insertable into the opening in the workpiece at least as far as the means by which it is actuated and in which the expandable member may be of substantially the same axial length as of a blind opening for substantially continuously gripping the peripheral wall of said blind opening substantially throughout the axial length of said wall.

(5) To provide an expandable mandrel, as aforesaid, in which the expandable member cooperates with an axially fixed radial face, in which the expandable member is urged against the face during its expansion and in which a workpiece, axially urged against said face by the machine operator during such expansion, will be maintained firmly seated against said face by the expanded mandrel to precisely axially locate said workpiece and to prevent rocking of the workpiece with respect to the axis of said expandable mandrel as when rotated and subjected to radial or tangential loads applied, for example, by a tool.

(6) To provide an expandable mandrel, as aforesaid, which can be manufactured economically by relatively simple machining operations with a high degree of accuracy and which has a relatively small number of parts.

(7) To provide an expandable mandrel, as aforesaid, which can be made in a wide variety of sizes, in which the expandable portion thereof may be relatively small in volume as compared to the volume of the workpiece to be held while still maintaining a firm grip thereon and which is capable of use under widely varying and disadvantageous conditions and by personnel having little or no special training in the use thereof.

(8) To provide an expandable mandrel, as aforesaid, which is capable of a relatively long service life with little or no maintenance, which can be maintained by personnel having little or no special training and in which the parts can be quickly and readily interchanged with comparable parts of differing size or character to adapt the mandrel to workpieces having openings of different size and shape.

Other objects and purposes of this invention will be apparent to persons acquainted with apparatus of this general type upon reading the following specification and inspecting the accompanying drawings.

In the drawings:

FIGURE 1 is a front elevational view of an expandable mandrel embodying the invention.

FIGURE 2 is a central cross-sectional view taken on the line II—II of FIGURE 1 and showing a workpiece gripped by said expandable mandrel.

FIGURE 3 is an enlarged sectional view substantially as taken on the line III—III of FIGURE 2.

Certain terminology will be used in the following description for convenience in reference only and will not be limiting. The words "rightwardly" and "leftwardly" will designate directions in the drawings to which reference is made. The words "forwardly" and "rearwardly" will refer to axial directions taken with respect to the expandable mandrel construction embodying the invention and appearing as the rightward and leftward directions, respectively, in FIGURE 2. The words "inwardly" and "outwardly" will refer to directions toward and away from, respectively, the geometric center of the device and designated parts thereof. Said terminology will include the words above specifically mentioned, derivatives thereof and words of similar import.

*General description*

In general, the objects and purposes of the invention are met by providing an expandable mandrel construction including a mounting member mountable upon the face plate of a lathe for rotation therewith. The mounting member axially slideably supports a coaxial spindle which extends axially therethrough. An expandable sleeve is supported on the forward end of the spindle by suitable ramp means and for rotation with said spindle. Said ramp means provides for expansion of said sleeve upon rearward movement of the spindle with respect to the mounting member. Rearward movement of the sleeve is limited by abutment with the forward face of the mounting member. The sleeve extends forwardly from the mounting member at least as far as the spindle so that full penetration of the sleeve into a blind opening in a workpiece will not be prevented by interference between the spindle and the radial wall of the blind opening.

*Detailed description*

The mandrel construction 10 embodying the invention (FIGURES 1 and 2) includes a substantially cylindrical mounting member 11. The mounting member 11 has a preferably integral radially extending mounting flange 12 on the rearward (leftward as seen in FIGURE 2) end thereof. The mounting flange includes a plurality of evenly circumferentially spaced counter sunk holes 13. Suitable screws, not shown, may be inserted into the holes 13 for fixing the mounting flange 12 to the forward face of the lathe face plate indicated in broken lines at 16 for rotation therewith. In the particular embodiment shown, the mounting member 11 has a rearwardly extending pilot 17 for maintaining said mounting member 11 coaxial with the face plate 16. A central opening 21 through the mounting member 11 has a radially enlarged and axially extending chamber 22 intermediate the ends thereof.

The mounting member 11 preferably has a forwardly extending central boss 36 having a radial face for abutting the rearward end of a workpiece W. A radial lubricant passage indicated in broken lines at 37 extends in this embodiment from a conventional Zerk fitting 38 on the periphery of the mounting member 11 to the central opening 21.

An internally threaded opening 39 extends axially out of the front radial face of the mounting member 11 for receiving any desired threaded stop or drive means, not shown, should it be desired to axially locate the workpiece W other than by the boss 36 or to drive the workpiece by means in addition to the expandable means hereinafter described.

A spindle 26 is axially reciprocably received in the central opening 21 and extends axially outwardly therefrom at both ends thereof. The rearward end of the spindle 26 is threaded as indicated at 27 for attachment to reciprocable actuating means such as the drawbar, not shown, of the lathe supporting the mandrel construction 10. The central portion 28 of the spindle 26 includes one or more, here for example, six circumferentially arranged flats, one of which is indicated at 29. An opening 31 extends radially through the mounting member 11 and into communication with the chamber 22. The opening 31 is radially reduced and threaded at its radial inner end 32 for receiving a set screw 33. The spindle 26 is normally axially located so that the flat 29 thereof is opposite the set screw 33. The set screw 33 does not normally contact the flat 29 but is sufficiently close thereto as to prevent rotation of the spindle 26 with respect to the mounting member 11 while allowing axial movement thereof at least within a limited range.

The forward end of the spindle 26 supports an expandable sleeve 41 (FIGURES 2 and 3) which is preferably substantially similar in construction to that shown in my United States Patent No. 3,117,797, filed May 2, 1962. Since the sleeve 41 is described in detail in the aforementioned Patent No. 3,117,797, said sleeve will be described only briefly here for purposes of convenience in reference. Thus, the sleeve 41 comprises a plurality of axially extending segments 42 each connected at opposite axial ends thereof to a different one of the adjacent segments by a relatively short integral web 43 for allowing radial expansion of the sleeve 41. Each of the segments 42 has an axially extending toothed ridge 44 extending radially inwardly therefrom, said toothed ridges 44 being circumferentially spaced by slots 46. The toothed ridges 44 each comprises a series of identical toothed ramps having forwardly facing surfaces 48 (FIGURE 2) which are moderately sloped with respect to the axis of the sleeve 41.

The forward end of the spindle 26 has a plurality of axially extending toothed ridges 51 which correspond in number, size, spacing and shape to the toothed ridges 44 of the sleeve 41. The toothed ridges 51 are axially reversed with respect to the ridges 44 to coact therewith whereby rearward axial movement of the spindle 26 causes radial expansion of the sleeve 41. In the particular embodiment shown, the toothed ridges 51 are preferably integral with the spindle 26. The ridges 51 are separated by grooves 53. The grooves 46 and 53 are of sufficient size to accept the toothed ridges 51 and 44, respectively.

Thus, the sleeve 41 is assembled as discussed in detail in said Patent No. 3,117,797 on the spindle 26 by aligning the teeth 53 with the ridges 44 and telescoping the sleeve 41 on the spindle 26. When the sleeve and spindle are correctly axially positioned, a small circumferential displacement of the sleeve 41 on the spindle 26 causes the toothed ridges 44 and 51 to enmesh whereby the grooves 46 and 53 are cleared and assume the radially aligned position of FIGURE 3. Such radial alignment of the grooves 46 and 51 allows placement thereinto of at least one axially extended, substantially rectangular key 54 for maintaining the toothed ridges 44 and 51 in contact with one another. The axial placement of the teeth 56 on the spindle 26 is such that when the sleeve 41 is in its relaxed or non-expanded position on the spindle 26 with the ridges 44 and 51 engaged, said sleeve and spindle extend forwardly approximately to the same extent.

*Operation*

To support a workpiece W having a blind, axially extending hole 57 on the mandrel construction 10, the workpiece W is telescoped over the sleeve 41 so that said sleeve and the forward end of the spindle 26 lie within the hole 57. Rearward urging of the spindle 26 firmly seats the rearward end of the sleeve 41 against the boss 36, and causes the toothed ridges 44 and 51 to interact for radially expanding the sleeve 41. The unexpanded sleeve 41 is preferably only slightly smaller in diameter than the blind opening 57. Hence, the afore-mentioned expansion of the sleeve 41 is sufficient to bring same firmly into contact with the peripheral wall of the blind opening 57 whereby the workpiece W is firmly gripped by the mandrel construction 10. The workpiece W is preferably continuously axially urged, such as by the machine operator, against the boss 36 as the sleeve 41 is being expanded, the positive contact force between the boss 36 and workpiece W being maintained by friction between the sleeve 41 and opening 57 after expansion is complete. Thus, the workpiece W is positively supported over a relatively large radial area for maintaining the workpiece W coaxial with the mandrel 10 and preventing wobbling of said workpiece W during rotation thereof. Such positive contact between the boss 36 and workpiece W also assures precisely repeatable axial workpiece locations when successive identical workpieces are to be held. Release of the workpiece W is accomplished by forward motion of the spindle 26 which allows the sleeve 41 to contact and hence release the workpiece.

In cases where the blind hole 57 is of lesser axial extent than the mandrel sleeve 41, suitable stop means, such as any conventional annular stop member, not shown, may be disposed by the member 11 by means of the threaded opening 39 for axially stopping the workpiece W. Where forces tending to rock a workpiece off the axis of the mandrel construction are negligible, the workpiece may, if desired, be spaced along the sleeve 41 from the abutment 36 and may be axially fixed only by frictional engagement with the sleeve 41. Although the mandrel construction 10 is particularly adapted for internally gripping a workpiece having a relatively short blind hole, it will be recognized that the end of the sleeve 41 and spindle 26 may be well spaced from the bottom of a blind hole and that the mandrel construction 10 can be used in through holes of length greater or less than itself without impairing its operation. It will be apparent that the outside diameter of the sleeve 41 can be varied over a wide range simply by replacing an existing sleeve 41 with another of the differing outside diameter and on the same spindle 26. Moreover, it will be apparent that the length of the sleeve 41 may be changed by substituting a longer or shorter spindle 26 and sleeve 41 for an existing spindle and sleeve.

While the foregoing has assumed throughout that the sleeve 41 would be stopped against the mounting member 11 (the abutment 36), and such is one of the advantages of the invention, operation of the invention is not so limited. Instead, if desired, the mandrel may be referenced to the bottom of the hole 57 by contacting same by the outer (rightward in FIGURE 2) end of the sleeve 41 and thereby permitting spacing of the workpiece W from the mounting member 11. In such case, it will be recognized that the outer (rightward in FIGURE 2) end of the spindle 26 cannot protrude beyond the adjacent end of the sleeve 41.

Although a particular preferred embodiment of the invention has been disclosed hereinabove for illustrative purposes, it will be understood that variations or modifications thereof which lie within the scope of the appended claims are fully contemplated.

The embodiments of the invention in which an exclusive property or privilege is claimed are defined as follows:

1. An expandable mandrel operable with a drawbar and adapted for gripping a workpiece by inserting a portion of the mandrel within an opening formed in said workpiece, the combination comprising:
   a mounting member adapted to have one end thereof affixed to the face plate of a machine tool, said mounting having an opening therethrough and further having an abutment face means on the other end thereof adjacent said opening and extending transversely to the longitudinal axis thereof;
   a spindle mounted in said mounting member opening and being axially movable with respect to said mounting member, one end of said spindle adapted to be connected to said drawbar, the other end of said spindle extending beyond said abutment face means;
   radially expandable sleeve means telescoped over the extending end of said spindle with one end of said sleeve means extending at least as far forwardly as said spindle so as to define the forwardmost extent of the mandrel, the other end of said sleeve means being positioned adjacent and in abutting engagement with said transverse abutment face means, said sleeve means further having an outside diameter whereby said sleeve means is adapted to be snugly but slideably disposable within said workpiece opening;
   ramp means in opposed slideable contact disposed on and between said sleeve means and the extending end of said spindle for causing radial movement of said sleeve means in response to axial movement of said spindle; said sleeve means abutting said abutment face means whereby subsequent axial movement of said spindle causes only radial movement of said sleeve means;
   said transverse abutment face means on said mounting member extending beyond the outer periphery of said sleeve means so as to contact and abut against one end of the workpiece for positioning same relative to the sleeve means when the workpiece is slideably received over and mounted on the sleeve means;
   whereby said workpiece is adapted to be mounted on said mandrel with said sleeve means being received within said workpiece opening, one end of said sleeve means and said workpiece being in abutting engagement with said abutment face means whereby axial movement of said spindle by said drawbar causes said sleeve means, by reason of said ramp means, to move only in a radial direction whereby said sleeve means expands and uniformly grips the periphery of said workpiece opening, the mandrel thus rigidly and securely holding said workpiece.

2. The mandrel construction as defined in claim 1 wherein said mounting member is substantially cylindrical and is adapted to be fixed to the forward face of a lathe face plate, said mounting member opening extending centrally therethrough, and an axially forwardly extending boss integral with said member and coaxial with said opening, said boss defining said transverse abutment face means and being adapted to engage one end of the sleeve means and the workpiece, respectively.

3. The mandrel construction defined in claim 1 wherein said ramp means comprises a plurality of axially spaced ramps on said sleeve means, each of said ramps being formed with a camming surface thereon with the camming surfaces of all of said ramps being substantially parallel to each other, said ramp cam surfaces on the spindle slideably coacting with the ramp cam surfaces on the sleeve means due to relative axial movement therebetween so as to radially expand said sleeve means, said sleeve means moving only in a radial direction during the expansion thereof.

4. The mandrel construction as defined in claim 1 wherein said ramp means comprises a plurality of axially aligned and circumferentially spaced, toothed ridges on said spindle and on said sleeve means, respectively, relative rotational movement between said sleeve means and said spindle causing the ridges on said sleeve means to be positioned within the circumferential spaces between the ridges on said spindle whereby said sleeve means can be moved axially so as to withdraw and remove the same from the spindle, whereby a different sleeve means can be substituted therefor.

5. The mandrel construction as defined in claim 1 wherein said sleeve means is adapted to be received within a workpiece having a blind opening therein, said sleeve means being no longer axially than said blind opening whereby the sleeve means is adapted to extend thereinto so as to position said workpiece closely adjacent the abutment face means against which the workpiece may axially bear during expansion of said sleeve means.

6. The mandrel construction defined in claim 1 wherein said ramp means includes a plurality of axially aligned, circumferentially spaced, toothed ridges on said spindle, said ridges each including a plurality of identical ramps, said ramps having axially and radially sloped surfaces and said ramp means further includes similar but oppositely axially arranged ramps on said sleeve means cooperable with the ramps on said spindle for expanding said sleeve upon axial movement of said spindle with respect thereto.

7. The mandrel construction defined in claim 1 wherein said mounting has a central opening therethrough;
   said spindle comprises an elongated rod-like member axially slideable within said central opening and having a flat in the central portion thereof;
   said mounting has a radially disposed opening therein for threadedly positioning a set screw radially adjacent said flat for preventing circumferential movement of said spindle with respect to said mounting.

References Cited

UNITED STATES PATENTS

| 2,684,854 | 7/1954 | Hohwart | 279—2 |
| 2,859,041 | 11/1958 | Sloan | 279—2 |
| 3,073,610 | 1/1963 | Mackinder | 279—2 |
| 3,117,797 | 1/1964 | Buck | 279—2 |
| 2,739,818 | 3/1956 | Benjamin | 279—2 |
| 2,851,274 | 9/1958 | Greer | 279—2 |
| 2,877,022 | 3/1959 | Parker | 279—2 |
| 2,929,635 | 3/1960 | Czerenda | 279—2 |
| 2,970,842 | 2/1961 | Drew | 279—2 |
| 3,050,313 | 8/1962 | Lengyel | 279—2 |

ROBERT C. RIORDON, *Primary Examiner.*

LESTER M. SWINGLE, *Examiner.*

J. V. STALHUTH, E. A. CARPENTER,
*Assistant Examiners.*